(12) United States Patent
Bailey et al.

(10) Patent No.: US 7,788,519 B2
(45) Date of Patent: Aug. 31, 2010

(54) METHOD, SYSTEM, AND APPARATUS FOR IMPROVING MULTI-CORE PROCESSOR PERFORMANCE

(75) Inventors: Daniel W. Bailey, Austin, TX (US); Todd Dutton, Southborough, MA (US); Tryggve Fossum, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 11/686,861

(22) Filed: Mar. 15, 2007

(65) Prior Publication Data

US 2007/0198872 A1    Aug. 23, 2007

Related U.S. Application Data

(62) Division of application No. 10/621,228, filed on Jul. 15, 2003, now abandoned.

(51) Int. Cl.
*G06F 1/00* (2006.01)
*G06F 1/26* (2006.01)
*G06F 12/00* (2006.01)
*G06F 15/00* (2006.01)

(52) U.S. Cl. .................. 713/500; 713/300; 713/320; 711/118; 711/163; 711/167; 712/28; 712/32; 712/200

(58) Field of Classification Search ............. 713/500, 713/300, 320; 711/118, 163, 167; 712/28, 712/32, 200

See application file for complete search history.

(56) References Cited

U.S. PATENT DOCUMENTS

| 5,168,554 | A |   | 12/1992 | Luke |
| 5,442,775 | A | * | 8/1995  | Whitted et al. ............. 713/601 |
| 5,737,615 | A |   | 4/1998  | Tetrick |
| 5,752,030 | A | * | 5/1998  | Konno et al. ............... 718/102 |
| 5,913,068 | A |   | 6/1999  | Matoba |
| 5,968,167 | A |   | 10/1999 | Whittaker et al. |
| 6,357,016 | B1|   | 3/2002  | Rodgers |
| 6,549,954 | B1|   | 4/2003  | Lambrecht et al. |
| 6,550,020 | B1|   | 4/2003  | Floyd et al. |
| 6,574,739 | B1|   | 6/2003  | Kung et al. |
| 6,640,282 | B2|   | 10/2003 | MacLaren et al. |
| 6,804,632 | B2|   | 10/2004 | Orenstien et al. |
| 6,883,107 | B2|   | 4/2005  | Rodgers et al. |
| 6,889,319 | B1|   | 5/2005  | Rodgers et al. |

(Continued)

FOREIGN PATENT DOCUMENTS

JP         09-185589        7/1997

(Continued)

OTHER PUBLICATIONS

Office Action from Counterpart China Patent Application No. 200410070913.7, dated Sep. 28, 2008 (6 pgs. Translation included).

(Continued)

*Primary Examiner*—Stefan Stoynov
(74) *Attorney, Agent, or Firm*—Blakely, Sokoloff, Taylor & Zafman LLP

(57) ABSTRACT

A system, apparatus, and method for a core rationing logic to enable cores of a multi-core processor to adhere to various power and thermal constraints.

6 Claims, 4 Drawing Sheets

U.S. PATENT DOCUMENTS

| | | | |
|---|---|---|---|
| 6,920,572 | B2 | 7/2005 | Nguyen et al. |
| 6,931,506 | B2 | 8/2005 | Audrain |
| 6,934,727 | B2 | 8/2005 | Berkowitz et al. |
| 6,971,034 | B2 | 11/2005 | Samson et al. |
| 6,990,598 | B2 * | 1/2006 | Sherburne, Jr. ............. 713/600 |
| 7,093,147 | B2 | 8/2006 | Farkas et al. |
| 7,318,164 | B2 * | 1/2008 | Rawson, III ................ 713/320 |
| 7,480,911 | B2 * | 1/2009 | Lee et al. .................... 718/104 |
| 2002/0018877 | A1 | 2/2002 | Woodall et al. |
| 2003/0014467 | A1 | 1/2003 | Hanzawa |
| 2003/0079151 | A1 | 4/2003 | Bohrer et al. |
| 2003/0084154 | A1 | 5/2003 | Bohrer et al. |
| 2003/0115495 | A1 | 6/2003 | Rawson, III |
| 2004/0128663 | A1 | 7/2004 | Rotem |

FOREIGN PATENT DOCUMENTS

| | | |
|---|---|---|
| JP | 01-280891 | 11/1999 |
| JP | 2003-029886 | 1/2003 |
| WO | WO 02/39242 A1 | 5/2002 |
| WO | WO 2005/010737 A2 | 2/2005 |

OTHER PUBLICATIONS

Office Action from Counterpart Korea Patent Application No. 10-2006-7000942, dated Mar. 19, 2008 (5 pgs. Translation included).

Office Action from Counterpart Korea Patent Application No. 10-2006-7000942, dated Feb. 26, 2007 (5 pgs. Translation included).

Office Action from Counterpart Japanese Patent Application No. 2002-520257, dated Jul. 29, 2008 (3 pgs. Translation included).

Fifth Office Action from Counterpart China Patent Application No. 200410070913.7, dated Mar. 2, 2009 (4 pgs. Translation included).

Office Action from Counterpart Japanese Patent Application No. 2002-520257, dated Feb. 25, 2009 (3 pgs. Translation included).

Second Foreign Office Action from Counterpart China Patent Application No. 200410070913.7, dated May 16, 2007 (8 pgs. Translation included).

Third Foreign Office Action from Counterpart China Patent Application No. 200410070913.7, dated Jun. 8, 2007 (9 pgs. Translation included).

Foreign Office Action from Counterpart Great Britain Patent Application No. GB0602753.6, dated May 23, 2007 (4 pgs).

Foreign Office Action from Counterpart Great Britain Patent Application No. GB0602753.6, dated Nov. 1, 2007 (3 pgs).

Foreign Office Action from Counterpart Taiwan Patent Application No. 93120990, dated Jul. 26, 2006 (6 pgs. Translation included).

Foreign Office Action from Counterpart Taiwan Patent Application No. 93120990, dated Apr. 26, 2007 (5 pgs. Translation included).

Office Action from U.S. Appl. No. 11/336,303, mailed Jun. 13, 2007, 5 pgs.

Office Action from U.S. Appl. No. 11/336,681, mailed Jan. 12, 2007, 12 pgs.

Office Action from U.S. Appl. No. 11/336,302, mailed Apr. 16, 2007, 11 pgs.

Notice of Allowance from U.S. Appl. No. 11/336,015, mailed Nov. 5, 2007, 11 pgs.

Sholander, P., et al., "The Effect of Algorithm-Agile Encryption on ATM Quality of Service", IEEE, 1997, pp. 470-474.

U.S. Appl. No. 11/336,302 Office Action mailed Nov. 6, 2006, 7 pgs.

CN Pat. Appl. No. 200410070913.7 First Office Action mailed Jun. 23, 2006, 9 pgs (includes English translation).

U.S. Appl. No. 11/366,015 Office Action mailed Oct. 25, 2006, 7 pgs.

IEEE, "IEEE 100 The Authoritative Dictionary of IEEE Standards Terms", *IEEE, IEEE 100, The Authoritative Dictionary of IEEE Standards Terms, 2000, Standards Information Network, 7th edition*, pp. 904, (2000), 3 pgs.

Office Action mailed Nov. 22, 2006 from U.S. Appl. No. 11/336,303, 8 pgs.

Office Action from foreign counterpart German Patent Application No. 11 2004 001 320.8-53, mailed May 10, 2010, 4 pgs.

Office Action from foreign counterpart China Patent Application No. 200710106805.4, mailed Feb. 12, 2010, 4 pgs.

Office Action from U.S. Appl. No. 11/336,015, mailed Apr. 16, 2007, 13 pages.

* cited by examiner

METHOD, SYSTEM, AND APPARATUS FOR IMPROVING MULTI-CORE PROCESSOR PERFORMANCE

This application is a divisional of U.S. patent application Ser. No. 10/621,228 filed Jul. 15, 2003, now abandoned.

BACKGROUND

1. Field

The present disclosure pertains to the field of power management. More particularly, the present disclosure pertains to a new method and apparatus for improving multi-core processor performance despite power constraints.

2. Description of Related Art

Power management schemes allow for reducing power consumption to achieve low power applications for various types of and systems and integrated devices, such as, servers, laptops, processors and desktops. Typically, software methods are employed for systems and integrated devices to support multiple power states for optimizing performance based at least in part on the Central Processing Unit (CPU) activity.

Present power management schemes either decrease voltage or frequency or both for reducing power consumption. However, this results in decreased overall performance. Also, some methods incorporate analog designs that have various challenges relating to loop stability for transient workloads, calibration, and tuning.

With the introduction of processors with multiple cores, power management becomes a major concern because of the increase in cores operating at high frequencies and voltages and need to adhere to various power constraints, such as, thermal limits, maximum current, and Vcc range.

BRIEF DESCRIPTION OF THE FIGURES

The present invention is illustrated by way of example and not limitation in the Figures of the accompanying drawings.

DETAILED DESCRIPTION

Figure 1:
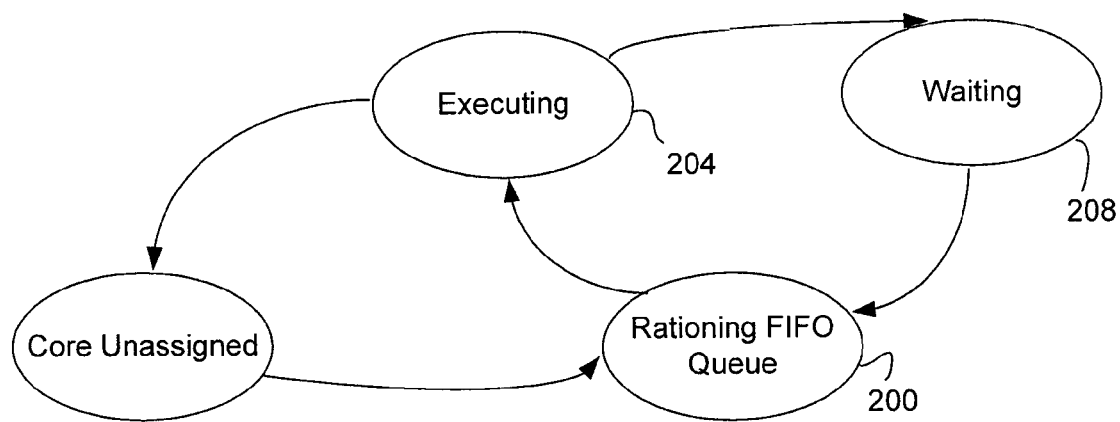
FIG. 1 illustrates a flowchart for a method utilized in accordance with an embodiment

The following description provides method and apparatus for improved multi-core processor performance despite power constraints. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, a problem exists for improving processor performance while adhering to power constraints. The present methods incorporate lowering the voltage or frequency at the expense of overall performance. In contrast, the claimed subject matter improves overall performance while adhering to power constraints. For example, a concept of "rationing the number of executing cores for a processor system" allows for increasing frequency as a result of disabling clocks to cores that are idle as they wait for a memory transaction to complete. For example, the claimed subject matter exploits the idle time period of processor cores by disabling the clocks to the core, that results in less power dissipation. Thus, a higher frequency can be utilized as a result of the decrease in power dissipation. In one embodiment, an appropriate executing core limit is calculated for the workload. Also, in the same embodiment, the number of executing cores are less than or equal to the number of available and ready threads. A thread is an independent set of instructions for a particular application.

In one embodiment, the claimed subject matter facilitates selecting a voltage/frequency operating point based on a prediction of the activity level of the threads running on all of the cores collectively. For example, TPC-C threads tend to be active 50-60% of the time, and spend 40-50% of their time idle, waiting for memory references to be completed. In such an environment, one would specify an executing core limit that would be, in one embodiment, 60% of the total number of cores on the die; if there were 8 cores, one would set the executing core limit to, in this case, five. One would then specify a voltage-frequency operating point that corresponds to having only five cores active and three cores inactive (low power state) at a time; this is a significantly higher operating frequency than one would specify if one was allowing all eight cores to be simultaneously active. The core rationing logic constrains the operations of the die, guaranteeing that no more than five cores (in this case) are active at any given moment. Statistics are gathered regarding the occupancy of the Waiting and Rationing queues (which will be discussed further in connection with FIG. 1); at intervals these statistics are analyzed to determine whether the operating point (executing core limit and its associated voltage/frequency pair) should be changed. If the Waiting queue tends to be empty and the Rationing queue tends to be full, that is an indication that cores are not making progress when they could be, and that to improve performance the executing core limit should be raised and the voltage/frequency reduced; conversely, if the Rationing queue tends to be empty, and the Waiting queue tends to be full, this may be an indication that one can increase performance by reducing the executing core limit and increasing the voltage/frequency point.

FIG. 1 illustrates a flowchart for a method utilized in accordance with an embodiment. In one embodiment, the flowchart depicts a method for a state diagram.

In the same embodiment, the state diagram illustrates a predetermined state machine for a processor core in a system. In this same embodiment, the state machine facilitates the "rationing of the cores" to improve processor performance as a result of disabling clocks to cores that are waiting for a memory transaction to complete.

In one embodiment, the state diagram has four defined states, such as, a Core Unassigned state 202, an Executing state 204, a Rationing FIFO Queue state 206, and a Waiting state 208. Initially, the Core Unassigned state is defined as follows: each core does not have an assigned thread. Subsequently, in the event that a core has a thread assigned to it, the claimed subject matter transitions to the Rationing FIFO Queue state 206. In one embodiment, FIFO is defined as a First In First Out.

Upon transitioning to the Rationing FIFO Queue state, a comparison between the number of executing cores and an executing core limit (ECL) is determined. In one embodiment, a processor or system specification determines the proper executing core limit in order to adhere to thermal power considerations. In one embodiment, the ECL is determined by a formula depicted later in the application. If the number of executing cores is less than ECL, the particular core transitions to the Executing state 204 if the core was the next one to be processed in the FIFO queue. Otherwise, the core remains in the Rationing FIFO queue 206.

Upon entering the Executing state, the core remains in this state unless an event occurs, such as, a memory reference and overheating event, and/or a fairness timeout. For example, a fairness timeout may be utilized to prevent a possible live lock state. In this context, a memory reference refers to a read or write operation to a particular memory address that does not reside in any cache memory coupled to the processor ("a miss in all levels of cache memory"). Therefore, an access to main memory is initiated.

If an event occurs as previously described, the core transitions to the Waiting state 208. Upon completion of the event, the core transitions to the Rationing FIFO queue state. This sequence of cycling between states 204, 206, and 208 occurs until the particular thread is completed. Upon completion of the thread, the core transitions to the Core Unassigned State.

However, the claimed subject matter is not limited to the four defined states in the state diagram. The claimed subject matter supports different amounts of states. FIG. 1 merely illustrates an example of limiting the number of executing cores to be less than the available number of threads. For example, one embodiment would allow for multiple waiting states. Alternatively, the waiting states could be replaced by another queue state.

Also, other embodiments of state diagrams would allow multiple priority levels for cores, as well as having different waiting queues depending on the nature of the event that provoked exit from the executing state (memory wait, thermal wait, ACPI wait, etc).

Typically, a core executes a memory read or write operation and subsequently executes an operation that is dependent on that operation (for example, it makes use of the data returned by a memory read operation). Subsequently, the core "stalls" waiting for that memory operation to be completed. In such a case, it asserts a signal to the central core rationing logic indicating that it is stalled; this is the indication that it is eligible to be disabled by the core rationing logic. The core rationing logic responds to this signal by "napping" the core in question—it asserts a "nap" signal to the core, which causes the core to block instruction issue and then transition into a (cache-coherent) low power state. Furthermore, the core rationing logic puts an identifier for that core in the Waiting queue. When the memory operation completes, the core deasserts the "stall" signal; the core rationing logic responds to this by moving the identifier for that core from the Waiting queue to the Rationing queue. If the number of currently executing (not "napped") cores is less than or equal to the Executing Core Limit, the core rationing logic removes the oldest identifier from the Rationing queue, and deasserts the "nap" signal to that core.

Figure 2:
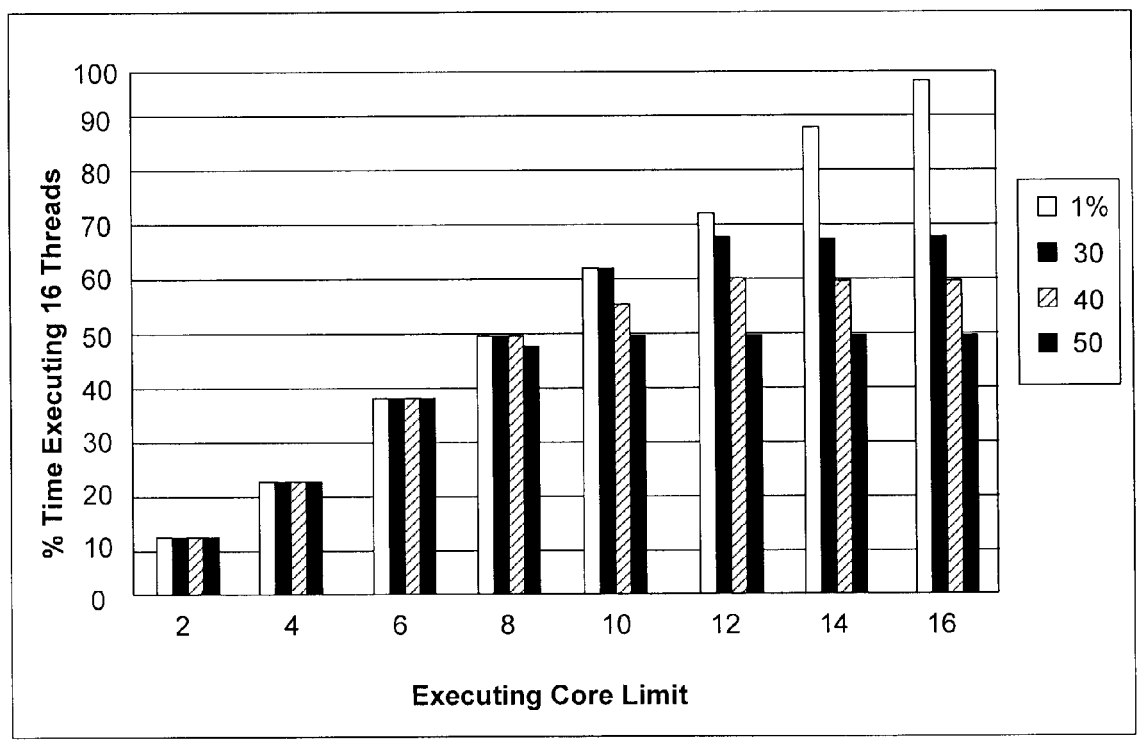
FIG. 2 illustrates a bar chart utilized in accordance with an embodiment.

FIG. 2 illustrates a bar chart utilized in accordance with an embodiment. In one embodiment, the bar chart depicts a percentage time spent executing for a 16-core multiprocessor as calculated by a Monte Carlo simulation for a variety of workloads. The independent axis illustrates the ECL for 2, 4, 6, 8, 10, 12, 14, and 16. Also, there is a bar for each ECL at a different workload as simulated with a memory reference duty cycle (with respect to executing time) of 1%, 30%, 40%, and 50%.

Analyzing the 50% memory reference duty cycle highlights the fact that the percentage time executing saturates at 50%. Thus, processing the memory references consumes half of the executing time when the ECL is equal to the number of available threads.

Figure 3:
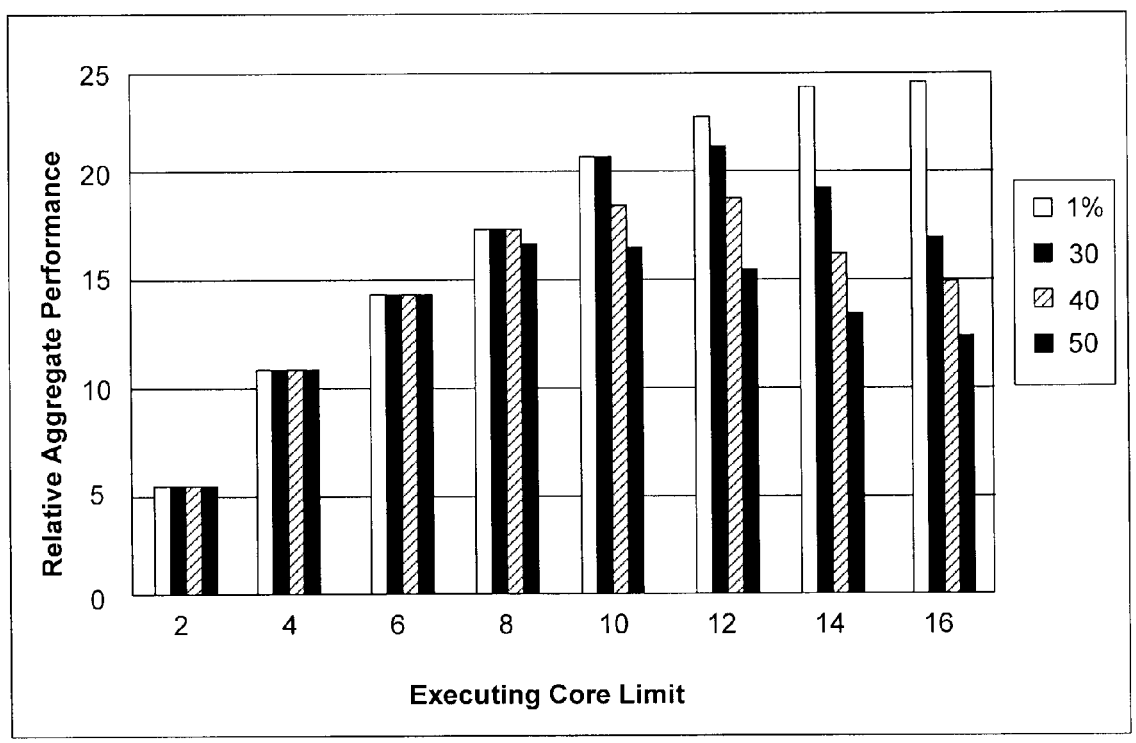
FIG. 3 illustrates a bar chart utilized in accordance with an embodiment.

FIG. 3 illustrates a bar chart utilized in accordance with an embodiment. In addition to FIG. 2, FIG. 3 illustrates the total performance as calculated by the product of the percentage time executing and the frequency. The total performance also incorporates the fact that frequency is inversely proportional to the ECL. As previously described, this relationship exists because as one reduces the number of executing cores, this results in reducing power dissipation. Therefore, the frequency can be increased to remain at the steady-state thermal limit.

Also, FIG. 3 depicts the maximum percentage time executing is 70% for the 30% memory reference duty cycle. Also, the product of the saturation limit and the number of threads demarcates the onset of saturation. Of particular note is the onset of saturation because this may be the region for improved or optimum performance.

In one embodiment, a self optimization formula is utilized to determine the appropriate ECL. In the formula, N depicts the number of threads that have context: % E depicts the percentage executing time; and % M depicts the percentage memory reference time. The formula is:

$$\text{int}(N \times (\%E/(\%E+\%M)))$$

Figure 4:
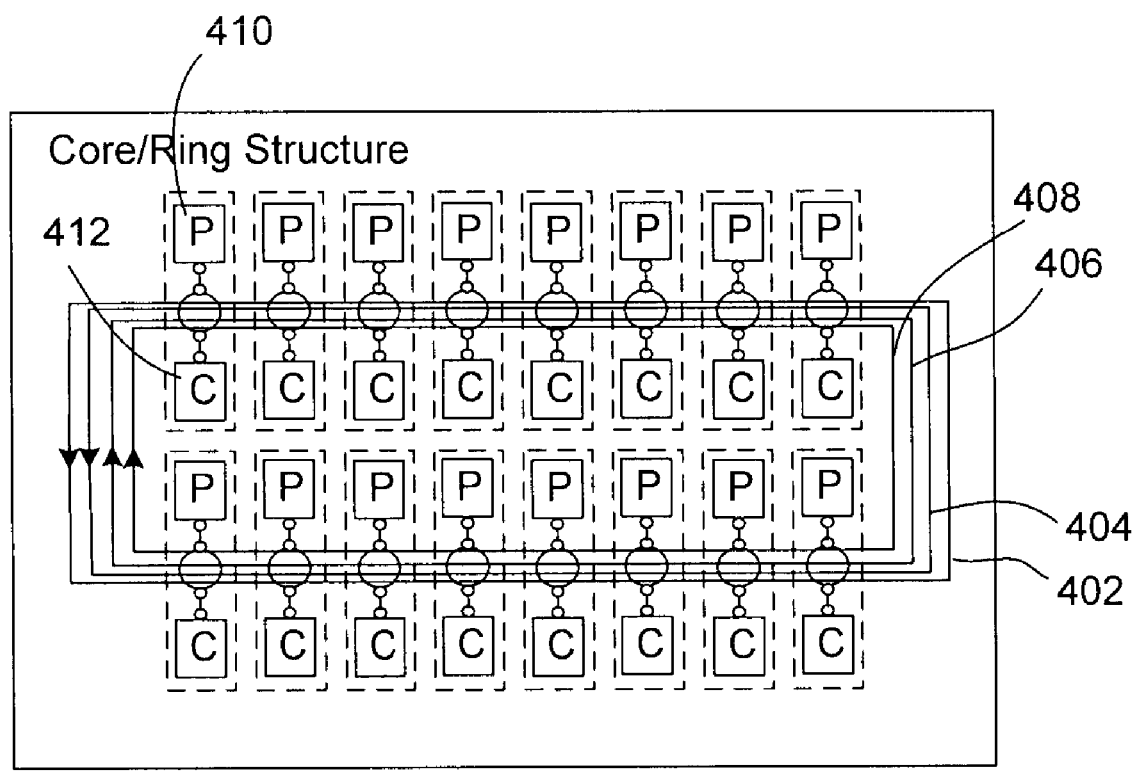
FIG. 4 illustrates an apparatus in accordance with one embodiment.

FIG. 4 depicts an apparatus in accordance with one embodiment. In one embodiment, the apparatus depicts a multi-core processor system with a plurality of processors 410 coupled individually to an independent bank of Level 3 (L3) Cache memory. In the same embodiment, a plurality of four busses form two counter rotating "rings"—a Request/Response (REQ0/RSP0) ring (402 and 404) in the clockwise direction, and a Request/Response ring (REQ1/RSP1) (406 and 408) in the counterclockwise direction. The circle in between the "P"s and the "C"s represents a pair of state devices for each ring. Thus, a set of circular pipelines are utilized for passing information from each processor core/cache bank to any other processor core/cache bank. The system interface logic contains the memory controllers for memory DIMMs, the router logic to handle the interconnection links to other processor dies and/or I/O subsystems, and assorted other system control logic (including the central core rationing controller).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method for disabling clocks to at least one processor core of a plurality of processor cores comprising:
    calculating an executing core limit based on a workload;
    asserting a signal to one processor core based at least in part on executing an operation that is dependent on a previous memory operation, the signal to disable the clocks to the processor core;
    blocking an instruction issue operation in response to the signal; and
    transitioning the core to a cache coherent low power state of operation;
    defining an operating point based at least in part on the executing core limit and a voltage and frequency pair, and adjusting the operating point based on analysis of a number of cores status with respect to a waiting or rationing queue.

2. A method for disabling clocks to at least one processor core of a plurality of processor cores comprising:
- calculating a predetermined executing core limit based on a workload;
- asserting a signal to one processor core based at least in part on executing an operation that is dependent on a memory operation, the signal to disable the clocks to the processor core;
- blocking an instruction issue operation in response to the signal;
- transitioning the core to a cache coherent low power state of operation;
- assigning an identifier for the disabled processor core; and
- de-asserting the signal for the disabled processor core upon completion of the memory operation if a number of executing cores is less than or equal to the predetermined executing core limit;
- defining an operating point based at least in part on the predetermined executing core limit and a voltage and frequency pair, and adjusting the operating point based on analysis of a number of cores status with respect to a waiting or rationing queue.

3. A core rationing logic to disable clocks to at least one processor core of a plurality of processor cores comprising:
- a workload circuit to calculate an executing core limit;
- a transmitter circuit to assert a signal to one processor core based at least in part on executing an operation that is dependent on a memory operation, the signal to disable the clocks to the processor core; and
- a comparison circuit to de-assert the signal for the disabled processor core upon completion of the memory operation if a number of executing cores is less than or equal to the executing core limit.

4. The logic of claim 3 further comprising the workload circuit to define an operating point based at least in part on the executing core limit and a voltage and frequency pair, and adjusting the operating point based on analysis of a number of cores status with respect to a waiting or rationing queue.

5. A core rationing logic to disable clocks to at least one processor core of a plurality of processor cores comprising:
- a workload circuit to calculate an executing core limit;
- a transmitter circuit to assert a signal to one processor core based at least in part on executing an operation that is dependent on a memory operation, the signal to disable the clocks to the processor core;
- a comparison circuit to de-assert the signal for the disabled processor core upon completion of the memory operation if a number of executing cores is less than or equal to the executing core limit;
- an assignment circuit to assign an identifier for the disabled processor core; and
- the transmitter circuit to de-assert the signal for the disabled processor in response to the signal de-asserted by the comparison circuit.

6. The logic of claim 5 further comprising the workload circuit to define an operating point based at least in part on the executing core limit and a voltage and frequency pair, and adjusting the operating point based on analysis of a number of cores status with respect to a waiting or rationing queue.

* * * * *